Figure 1:
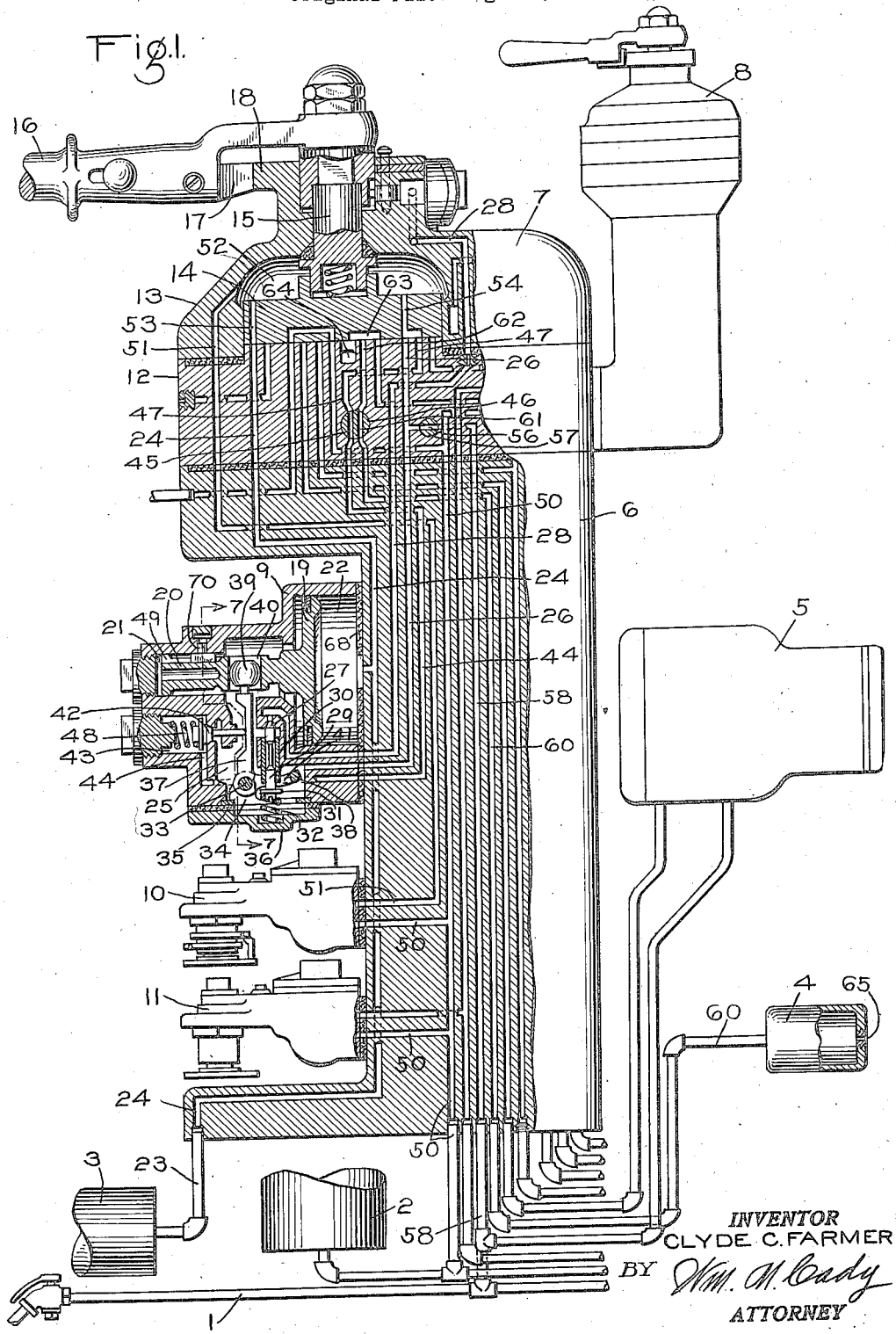
Figure 2:
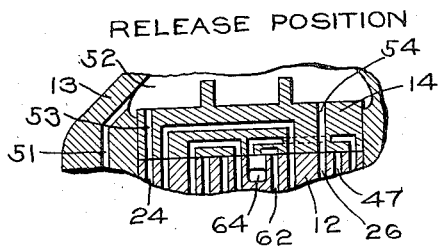
Figure 5:
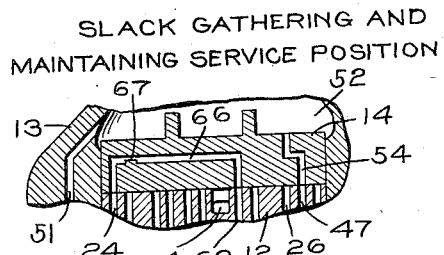
Figure 3:
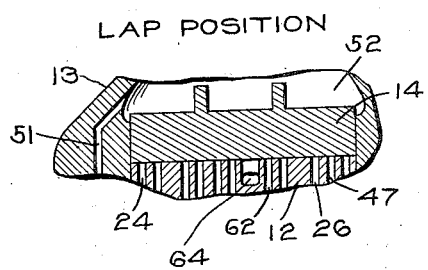
Figure 6:
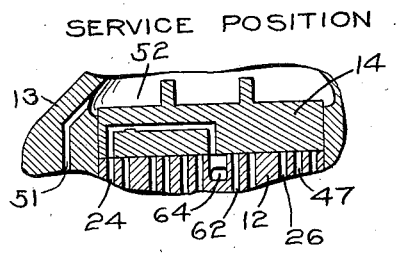
Figure 4:
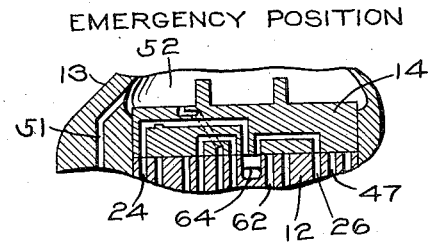

April 21, 1936.   C. C. FARMER   2,038,168

FLUID PRESSURE BRAKE

Original Filed Aug. 17, 1933   2 Sheets-Sheet 1

INVENTOR
CLYDE C. FARMER
BY Wm. W. Cady
ATTORNEY

RELEASE POSITION

SLACK GATHERING AND MAINTAINING SERVICE POSITION

LAP POSITION

SERVICE POSITION

EMERGENCY POSITION

INVENTOR
CLYDE C. FARMER
BY Wm. M. Cady
ATTORNEY

Patented Apr. 21, 1936

2,038,168

UNITED STATES PATENT OFFICE 2,038,168

FLUID PRESSURE BRAKE

Clyde C. Farmer, Pittsburgh, Pa., assignor to The Westinghouse Air Brake Company, Wilmerding, Pa., a corporation of Pennsylvania Original application August 17, 1933, Serial No. 685,576. Divided and this application April 19, 1934, Serial No. 721,306

3 Claims. (Cl. 303—60)

This application is a division of my Patent No. 1,975,264, relating to train fluid pressure brake systems.

The present invention relates to the feature of controlling the rate of reduction in brake pipe pressure in effecting an application of the brakes and more particularly to the automatic brake valve device for effecting such control.

As pointed out in my above mentioned pending application, it is desirable, in effecting a service application of the brakes on a long train, to first make a light reduction in brake pipe pressure so as to obtain only a light serial application of the brakes on the train, in order to prevent the harsh run in of the slack in the train, and after the slack has gathered to further reduce the brake pipe pressure to obtain the desired braking force to stop or slow down the train. It has also been pointed out that with the automatic brake valve device heretofore employed, it has been necessary for the engineer to move the brake valve device to service position to initiate the reduction in brake pipe pressure and then move it to lap position to make the desired initial light reduction in brake pipe pressure, in other words, the degree of reduction would be left to the engineer's judgment, with the result that unless the operator exercised extreme care in the manipulation of the brake valve device a too heavy reduction would be effected, which would cause the brakes to be applied with such force as to cause the slack in the train to gather harshly.

It has been further described in my pending application that the desired limited reduction in brake pipe pressure is obtained by the use of an automatic brake valve device having in addition to the usual service application position, another service application position in which fluid under pressure is vented from an equalizing reservoir to a small reduction reservoir to limit the reduction in equalizing reservoir pressure and consequently in brake pipe pressure.

It will be understood that if there is leakage from the brake pipe while the automatic brake valve device is in the added service position, such leakage would increase the amount of reduction in brake pipe pressure over that desired, with the result that too heavy an application of the brakes would be effected on the front end of the train which, of course, would tend to cause the slack in the train to gather harshly and is therefore objectionable.

The principal object of the invention is to provide an improved equalizing discharge valve device which is adapted to operate to control the venting of fluid under pressure from the brake pipe in accordance with the reduction in the equalizing reservoir pressure and which is also adapted to operate to supply fluid under pressure to the brake pipe at a rate equal to the rate of leakage from the brake pipe, thus preventing any drop in brake pipe pressure due to leakage and therefore eliminating the objectionable feature hereinbefore mentioned.

Other objects and advantages of the invention will appear in the following more detailed description.

Figure 7:
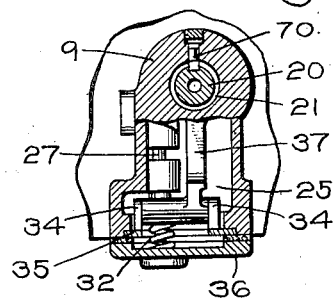

In the accompanying drawings, Fig. 1 is a diagrammatic view, mainly in section, of a portion of a fluid pressure brake equipment embodying a brake valve pedestal, an automatic brake valve device and equalizing discharge valve device constructed and combined in accordance with the invention; Figs. 2 to 6, inclusive, are fragmentary diagrammatic sectional views of the automatic brake valve device illustrating the rotary valve thereof in its several brake controlling positions; and Fig. 7 is a fragmentary sectional view of the equalizing discharge valve device taken on the line 7—7 of Fig. 1.

As shown in the drawings, the brake equipment may comprise the usual brake pipe 1, a main reservoir 2, an equalizing reservoir 3, a reduction limiting reservoir 4, a quick action valve device 5, a brake valve pedestal 6 on which is suitably mounted an automatic brake valve device 7, an independent brake valve device 8, an equalizing discharge valve device 9, a feed valve device 10 and a reducing valve device 11. The other parts of the fluid pressure brake equipment may be identical with the equipment shown and described in my aforementioned pending application.

The quick action valve device 5 and independent brake valve device 8 are shown only in outline but it will be understood that they may be identical with the corresponding devices shown in detail in said pending application.

The feed valve device 10 may be of the usual construction and is adapted to function in the usual manner to reduce the pressure of fluid from that carried in the main reservoir 2 to that normally carried in the brake pipe 1.

The automatic brake valve device 7 may comprise a casing having a valve seat section 12 and a cap or cover section 13 which are secured together and to the pedestal 6. The cover section is provided with a bore containing a rotary valve 14, the face of which slidably contacts with the valve seat carried by the seat section 12 and the peripheral edge surface of which slidably contacts with the cover section 13 within said bore. The rotary valve is operatively connected to the inner end of an operating stem 15 suitably journaled in the cover section 13 of the casing. Exteriorly of the cover section 13 there is secured to the outer end of the stem 15 an operating handle 16, through the medium of which the stem and thereby the rotary valve is moved. This handle is provided with the usual spring-pressed plunger 17 which is adapted to cooperate with a notched quadrant 18, carried by the cover section 13, to yieldably resist movement of the handle from one position to another and to indicate to the engineer when the handle is in a proper control position.

The equalizing discharge valve device 9 may comprise a casing in which there is operatively mounted a piston 19 having a stem 20 which is slidably guided in the casing within a bore 21. At one side of the piston 19 there is a piston chamber 22 with which the equalizing reservoir 3 is in constant communication by way of a pipe 23 and a passage 24 leading to the seat of the rotary valve 14 of the automatic brake valve device. At the other side of the piston 19 there is a valve chamber 25 which is in constant open communication with a passage 26 leading to the seat for the rotary valve 14, and which contains an exhaust valve 27 which is operative to control communication from the valve chamber 25 to an exhaust passage 28 which, as fully described in my aforementioned pending application, is open to the atmosphere in every position of the automatic brake valve device except running and release positions and which, in these two latter positions, is closed to the atmosphere by a valve (not shown). The exhaust valve 27 is provided with a stem 29 which is slidably guided in a tubular bushing 30 carried by the casing. The valve stem 29 extends through the bushing and adjacent its end is provided with a collar 31. Interposed between and engaging the outer face of this collar and the casing is a coil spring 32 which normally maintains the exhaust valve 27 seated as shown in Fig. 1 of the drawings.

Contained in the valve chamber 25 is a bell-crank lever which is rockably mounted on a pin 33 mounted on inwardly extending spaced lugs 34 of a support member 35 clamped between the casing and a cover plate 36, said lever comprising arms 37 and 38. The end portion 39 of the arm 37 is substantially spherical in form and is operatively engaged by the piston stem 20 within an opening 40 which preferably extends through the stem. The arm 38 is provided with an opening 41 through which the lower ends of the bushing 30 and exhaust valve stem 29 extend, said arm on each side of the opening being adapted to operatively engage the inner face of the collar 31 to control the operation of the exhaust valve 27. The arm 37, at a point intermediate its spherical end 39 and the pin 33, is adapted to operatively engage the end of the stem of a supply valve 42 contained in a chamber 43 which is in constant open communication with a passage 44 open to the rotary valve 14 through a port 45 in a cut-out cock 46 rotatably mounted in the seat section 12 of the casing and a passage 47 with which the port 45 is in registration, said valve being normally maintained seated by the action of a coil spring 48 as shown in Fig. 1.

It will be understood that due to the form of the end portion 39 of the arm 37, free vertical and rocking movement of the end 39 relative to the piston stem 20 is permitted, thus preventing any binding action from being set up between the arm and piston stem upon the operation of the piston 19.

The piston stem 20 is provided with a longitudinally extending groove or way 49 and within this groove, the stem is engaged by the head of a pin 70 mounted in the casing. The head of the pin permits longitudinal movement of the stem but prevents axial rotation thereof, thus effectively eliminating any possibility of the piston stem binding against the arm 37 of the bell-crank lever.

From an inspection of Figs. 1 and 7 of the drawings it will be seen that upon the removal of the cap plate 36, the supporting member 35 and bell-crank lever mounted thereon may be removed or replaced as a unit through the open end of the valve chamber 25, thus facilitating the assembly of the device and repairs thereto.

In initially charging the equipment, fluid under pressure, supplied to the main reservoir 2 in the usual well known manner, flows through a pipe and passage 50 to the feed valve device 10 and to the reducing valve 11. Fluid under pressure also flows through the pipe 50 to other parts of the equipment which are not shown in the present embodiment of the invention but which may be identical with the equipment shown and described in my aforementioned pending application.

Fluid under pressure supplied to the feed valve device 10 flows therefrom through a passage 51 to the usual chamber 52 at the back of the rotary valve 14.

In charging the equipment the rotary valve 14 of the automatic brake valve device will be first moved by the engineer to release position and maintained in this position for a predetermined period of time and will be then moved to running position. With the rotary valve in release position the supply of fluid to charge the equipment is from the main reservoir 2 and with the rotary valve in running position, the supply of fluid is from the feed valve device 10. By thus supplying fluid under pressure from the main reservoir, the time required to fully charge the equipment is materially reduced over that which would be required if fluid were supplied from the feed valve device only.

With the rotary valve in release position fluid under pressure is supplied from the main reservoir to the rotary valve chamber 52 in the manner described in my aforementioned pending application.

From the rotary valve chamber 52 fluid under pressure flows by way of a port 53 in the rotary valve 14 and passage 24 to piston chamber 22 of the equalizing discharge valve device 9 and from passage 24 fluid under pressure flows through pipe 23 to the equalizing reservoir 3. Fluid under pressure also flows from the rotary valve chamber 52 through a port 54 in the rotary valve 14, passage 26, a port 56 in a cock 57 rotatably mounted in the seat section of the casing and a passage and pipe 58. Fluid under pressure flows through passage 26 to the valve chamber 25 of the equalizing discharge valve device 9.

With the rotary valve 14 in running position, the flows of fluid from the main reservoir 2 to the rotary valve chamber 52 is closed in the same manner as has been described in my aforementioned pending application, so that the chamber 52 is charged with fluid supplied by the feed valve device 10.

In this position of the rotary valve 14, the port 54 in the valve continues to establish communication from the rotary valve chamber 52 to the passage and also establishes a communication from said valve chamber to passage 47 which is open by way of port 45 in the plug valve 46 and passage 44 to the supply or maintaining valve chamber 43, so that the brake pipe 1 and exhaust and maintaining valve chambers 25 and 43 respectively, of the equalizing valve device are charged with fluid at feed valve pressure.

In running position of the rotary valve 14 the port 53 therein continues to establish communication from the rotary valve chamber 52 to the passage 24 and consequently the equalizing reservoir 3 and piston chamber 22 of the equalizing discharge valve device are charged with fluid at feed valve pressure.

Further, with the rotary valve in release position the reduction reservoir 4 is open to the atmosphere by way of a pipe and passage 60, a port 61 in the plug valve 46, a passage 62, a cavity 63 in the rotary valve 14 and an exhaust passage 64. This reservoir is constantly open to the atmosphere through a passage of small diameter in a choke plug 65 which has screw-threaded connection with the reservoir casing.

When the equipment is fully charged, the fluid pressures acting on opposite sides of the equalizing discharge valve piston are substantially equal, so that normally the several parts of the equalizing valve device will remain in their normal positions as shown in Fig. 1.

When it is desired to effect a service application of the brakes, especially on a very long train, the engineer by the use of the brake valve handle 16, first moves the rotary valve 14 to slack gathering and maintaining service position and leaves it in this position for a predetermined period of time, say for instance from twenty to twenty-five seconds, and then moves the rotary valve to service position.

With the rotary valve 14 in slack gathering and maintaining position, the communication from the rotary valve chamber 52 to the passage 26 leading to the brake pipe 1 and valve chamber 25 of the equalizing discharge valve 9 is lapped so as to close off the flow of fluid from the rotary valve chamber to the brake pipe and valve chamber 25. With the rotary valve in this position a cavity 66 therein connects the passage 24 to the passage 62, said cavity having therein a restriction 67. The passage 24 leads from the equalizing reservoir 3 and piston chamber 22 of the equalizing discharge valve device 9, and the passage 62 leads to the reduction reservoir 4 by way of the port 61 in the plug valve 46 and passage and pipe 60, so that when the passages 24 and 62 are connected in the manner just described, fluid under pressure flows from the equalizing reservoir 3 and piston chamber 22 at substantially a service rate, as governed by the flow of fluid past the restriction 67, until such time as the equalizing reservoir pressure equalizes into the reduction reservoir, when the reduction in equalizing reservoir pressure continues at a slow rate, as governed by the flow of fluid from the reduction reservoir to the atmosphere by way of the passage in the choke plug 65.

The reduction reservoir 4 is of such a volume that upon the substantial equalization of the pressures in the equalizing and reduction reservoirs, the equalizing reservoir pressure will have been reduced approximately five pounds and this reduction will be accomplished within a short period of time.

Further with the rotary valve 14 in slack gathering and maintaining service position, the port 54 in the rotary valve continues to establish communication from the rotary valve chamber 52 to the passage 47, so that the maintaining valve chamber 43 of the equalizing discharge valve device 9 is maintained charged with fluid at feed valve pressure.

Upon the reduction in the pressure of fluid in the piston chamber 22 of the equalizing discharge valve device in the manner hereinbefore described, fluid at brake pipe pressure in the exhaust valve chamber 25, causes the equalizing discharge valve piston 19 to move to its extreme outer position, that is to say, into sealing engagement with a gasket 68 which is clamped between the casing of the equalizing discharge valve device and the pedestal 6.

As the piston 19 is being thus moved, the stem 20 thereof causes the bell-crank lever, contained in the exhaust valve chamber 25, to rock on the pin 33 in a clockwise direction, and as the lever is thus rocked, the arm 38 thereof engages the collar 31 on the valve stem 29 and, through the medium of the collar and stem, moves the exhaust valve 27 away from its seat. With the exhaust valve unseated, fluid under pressure is vented from the chamber 25 and consequently from the brake pipe 1 to the atmosphere by way of passage 28 which, as hereinbefore described, is open to the atmosphere.

Now when the pressure of fluid in the exhaust valve chamber 25 has been reduced, by the flow of fluid to the atmosphere, to a point slightly less than the pressure of fluid in the piston chamber 22, fluid under pressure in this latter chamber causes the piston 19 to move inwardly toward its normal position of rest.

As the piston 19 is thus being moved, the piston stem 20 causes the bell-crank lever to rock in a counter-clockwise direction on the pin 33, causing the arm 38 of the lever to move in a direction away from the collar 31 carried by the exhaust valve stem 29, and upon such movement of the arm 38, the spring 32 acts to advance the exhaust valve 27 toward its seat, and the valve restricts the flow of fluid from the valve chamber 25 to the atmosphere.

Now if the rate of reduction in the pressure of fluid in the exhaust valve chamber 25 does not exceed that of the reduction in the reduction reservoir pressure, by the flow of fluid through the passage of small diameter in the choke plug 65, the piston 19 will come to a stop and the flow of fluid from the chamber 25 and brake pipe 1 past the partially closed exhaust valve 27, to the atmosphere, will continue. In some cases, the piston may not come to a stop until after the exhaust valve has seated, but will operate to again unseat the valve when the pressure of fluid in piston chamber 22 reduces to a point slightly less than the pressure of fluid in chamber 25.

If, due to brake pipe leakage, the pressure of fluid in the exhaust valve chamber 25 should be caused to reduce at a faster rate than the rate at which the pressure of fluid in piston chamber 22 is being reduced by the flow of fluid from the reduction reservoir 4 through the small passage in the choke plug 65, fluid at the higher pressure in piston chamber 22 will cause the piston 19 to move inwardly, that is to say, in a direction toward the left hand, from its normal position.

As the piston 19 is thus moved, the stem 20 thereof causes the bell-crank lever to rock in a counter-clockwise direction, and when so rocked, the arm 37 thereof engages the stem of the maintaining valve 42 and, through the medium of the stem unseats the valve. With the valve 42 unseated fluid at feed valve pressure flows from the maintaining valve chamber 43 to the exhaust valve chamber 25 and from thence flows to the brake pipe 1 by way of passage 26, port 56 in the plug valve 57 and passage and pipe 58. By thus supplying fluid under pressure to the brake pipe, the brake pipe pressure will not be permitted to reduce at a faster rate than that at which the equalizing reservoir is being reduced.

When, after the maintaining valve 42 has been moved to supply fluid under pressure to the brake pipe 1, the brake pipe pressure in exhaust valve chamber 25 becomes slightly greater than the equalizing reservoir pressure in piston chamber 22, fluid at the higher pressure in chamber 25 causes the piston 19 to move in a direction toward the right hand causing the bell-crank lever, contained in the chamber 25, to rock in a clockwise direction, and as the lever is thus moved, the spring 48 acts to cause the maintaining valve 42 to seat and close off the flow of fluid from the chamber 43 to the chamber 25 and brake pipe 1.

To initiate a release of the brakes, the rotary valve 14 of the automatic brake valve device may be turned to release position in which fluid under pressure is supplied from the main reservoir 2 to the brake pipe 1 and then after a predetermined interval of time has elapsed, the rotary valve 14 is turned to running position in which fluid at feed valve pressure is supplied to the brake pipe, the course of the flow of fluid in each of said positions being substantially the same as hereinbefore traced in connection with the initial charging of the equipment, and with the equipment fully charged, the several parts of the equalizing discharge valve will be in their normal position as shown in Fig. 1 of the drawings.

Since the present invention relates particularly to the equalizing discharge valve device and its operation to control brake pipe pressure when the automatic brake valve device is in slack gathering and maintaining service position, a description of the operation of the equipment with the brake valve device in lap, service or emergency position is deemed unnecessary, especially when it is understood that such description is contained in my aforementioned pending application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, an equalizing reservoir and a brake valve device having a brake applying position for venting fluid under pressure from the equalizing reservoir, of a discharge valve operative to vent fluid under pressure from the brake pipe, a supply valve operative to supply fluid under pressure to the brake pipe, a bell-crank lever having an arm for actuating said release valve and having another arm for actuating said supply valve, a piston stem operatively connected to the free end of the second mentioned arm for actuating said lever, the connection between the arm and piston stem providing for free movement of the arm at an angle to the line of travel of the piston stem when the stem is moved, a piston subject to the opposing pressures of the equalizing reservoir and brake pipe and operative upon a reduction in equalizing reservoir pressure below the brake pipe pressure for moving said piston stem and thereby said lever to actuate said release valve to vent fluid under pressure from the brake pipe and operative upon a reduction in brake pipe pressure below equalizing reservoir pressure for moving said piston stem and thereby said lever to actuate said supply valve to supply fluid under pressure to the brake pipe.

2. In a fluid pressure brake, the combination with a brake pipe, of an equalizing reservoir, an equalizing discharge valve device comprising a casing having an open ended chamber, a cap closing the open end of said chamber, a movable abutment in said chamber subject to the opposing pressures of the brake pipe and equalizing reservoir and having an operating stem, a valve for venting fluid under pressure from the brake pipe, a support member clamped between said casing and cap, and means in said chamber and carried by said member operative by said stem for actuating said valve, said means and member being removable from the casing as a unit through the open end of said chamber upon the removal of said cap.

3. In a fluid pressure brake, the combination with a brake pipe, of an equalizing reservoir, an equalizing discharge valve device comprising a casing having an open ended chamber, a cap closing the open end of said chamber, a movable abutment in said chamber subject to the opposing pressures of the brake pipe and equalizing reservoir and having an operating stem, a valve for venting fluid under pressure from the brake pipe, a support member clamped between said casing and cap, and a lever pivotally carried by said member and operative by said stem for actuating said valve, said means and member being removable from said chamber as a unit upon the removal of said cap.

CLYDE C. FARMER.